Figure 1:
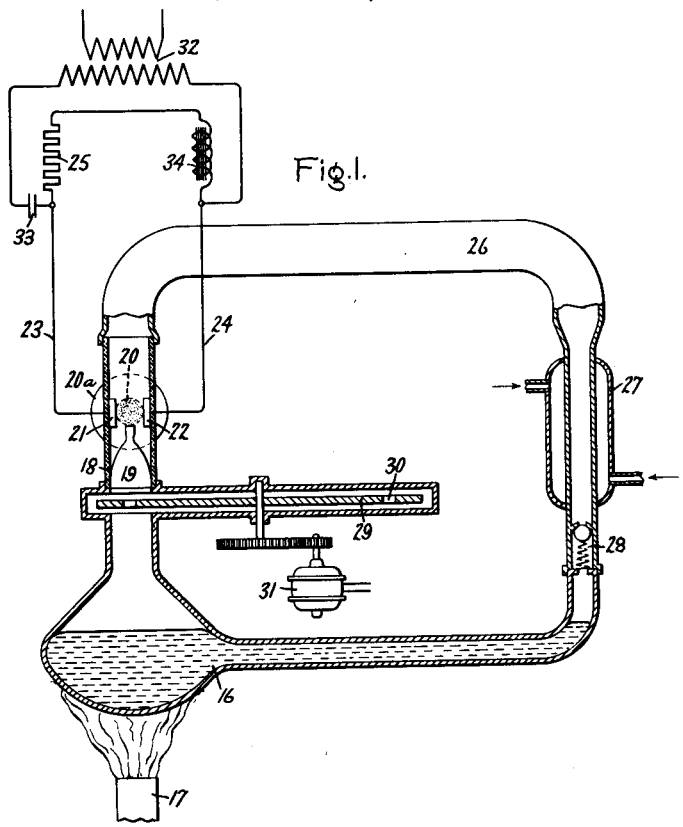

June 27, 1933.  E. RUPP  1,916,076

METHOD OF AND APPARATUS FOR GENERATING ELECTRIC ENERGY

Filed Feb. 1, 1932

Inventor:
Emil Rupp,
by Charles V. Tullar
His Attorney.

Patented June 27, 1933

1,916,076

UNITED STATES PATENT OFFICE

EMIL RUPP, OF BERLIN-FROHNAU, GERMANY, ASSIGNOR TO GENERAL ELECTRIC COMPANY, A CORPORATION OF NEW YORK

METHOD OF AND APPARATUS FOR GENERATING ELECTRIC ENERGY

Application filed February 1, 1932, Serial No. 590,214, and in Germany February 11, 1931.

The present invention relates to a method of and an apparatus for generating electric energy, more particularly to the transformation of the kinetic energy contained in a jet or stream of fluid into electric energy. Methods and apparatus for directly transforming the kinetic energy of a stream of fluid such as a water-fall by passing such fluid through an electromagnetic field which have been heretofore proposed have little efficiency owing to the short-circuiting effect of the moving fluid with respect to the induced electromotive force.

The object of my invention is an improved method of and an apparatus for transforming the kinetic energy of a stream of fluid into electric energy whereby the short circuiting effect is substantially eliminated.

For a consideration of what I believe to be novel and my invention, attention is directed to the following description and the claims appended thereto in connection with the drawing which forms a part of my specification.

Figure 2:
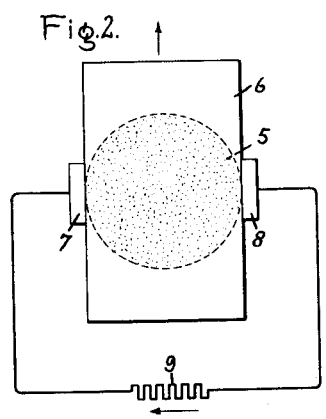
Figure 3:
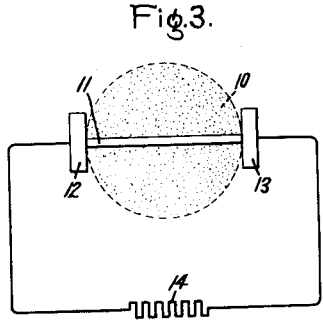

In the drawing I have shown in Fig. 1 by way of example a diagrammatic embodiment of an apparatus for carrying out the method of my invention. Figs. 2 and 3 are explanatory illustrations.

In order to make clear the object of my invention, particularly the above mentioned short circuiting effect, attention is directed to Figs. 2 and 3 representing diagrammatic illustrations of two known physical experiments. In Fig. 2 the dotted section 5 representes a magnetic field directed to the observer and 6 is a metallic blade which may be moved up or down. 7 and 8 are two electrodes engaging the edges of blade 6. Connected to electrodes 7 and 8 is a work circuit including a resistance 9. According to a well known law in physics the movement of the blade in an upward direction, as indicated by the arrow, through the indicated magnetic field induces an electromotive force at the edges of the blade which may be used to force an electric current through the work circuit in the direction indicated by an arrow.. When, as in the present case, the blade is of an area greater than that of the magnetic field, the part of the blade projecting beyond the magnetic field will form a path for an electric current with respect to the induced electromotive force which is of less resistance than that of the work circuit. In other words, the blade itself forms a parallel or shunt circuit to the work circuit and as the resistance of the blade is small with respect to that of the work circuit the blade may form a short circuit with respect to the electromotive force so that the greater part of the electric energy which may be generated is lost within the blade in the form of heat. This naturally results in a very low efficiency of the apparatus.

In order to overcome this drawback it is well known to use instead of a blade a conductor, as indicated in Fig. 3, in which 10 represents the magnetic field corresponding to field 5 in Fig. 2, 11 is the conductor moved through the electromagnetic field, 12 and 13 are the electrodes engaging the conductor and connected to a work circuit including a resistance 14. The efficiency with the apparatus shown in Fig. 3 is considerably improved owing to the fact that no short-circuiting effect of the electromotive force induced between the ends of the conductor or wire takes place by the conductor itself. Practically all applications of producing electric energy by magnetic induction are based on the principle outlined in connection with Fig. 3. Applicant's invention primarily consists in the proper application of this principle in the method and apparatus for transforming the kinetic energy of a moving fluid into electric energy.

The method of the present invention accordingly consists in the substantial elimination of the short circuiting effect of the moving fluid which is achieved by increasing the electric resistance of this fluid, more particularly by subdividing or interrupting the stream of fluid to form individual parts which are successively passed through a magnetic field.

Referring to Fig. 1, where I have shown an embodiment for carrying out my invention, 16 represents a container for fluid, for instance, mercury. 17 is a heating means for vaporizing the fluid and forming in effect with container 16 a boiler for producing a stream of fluid. Connected to the boiler is a tubular member or conduit 18 which is made of insulating material. This conduit is provided with a nozzle-like restriction, in the present instance indicated as a nozzle 19, for changing static energy of the generated stream of fluid into kinetic energy. The dotted section represents a magnetic field 20 which may be produced by a magnet $20_a$, diagrammatically indicated in the drawing. 21 and 22 represent two electrodes connected to wires 23 and 24 which define with a resistance 25 a work circuit. Connected to the upper part of tubular member 18 is a conduit or passage 26 for returning the vapor to the boiler. Surrounding this conduit is a means 27 for condensing the vapor within conduit 26. 28 is a check valve provided in conduit 26.

The apparatus so far described represents in principle a known arrangement for transforming the kinetic energy of fluid jets into electric energy. In order to eliminate the short-circuiting effect of the moving fluid with respect to the induced electromotive force I provide according to my invention a means for subdividing the moving fluid into individual parts. This may be performed as shown in the present instance by a wheel 29 provided with a plurality of openings 30 and driven by a motor 31. With this arrangement the jet of fluid, which in the present instance is in gaseous form, is periodically interrupted, whereby individual parts of fluid are formed. The rotating wheel and the means for driving it form in substance a periodically operated valve means.

As fluids are non-conductive or have in most cases a high electrical resistance it is preferable to provide means for making such fluid conductive. This may be performed by ionizing the fluid. In the present instance I have shown a Tesla transformer 32 having its primary winding connected to a suitable source of energy, not shown, and its secondary winding connected to the electrodes 21 and 22 respectively. 33 represents a capacitor or condensor inserted between one terminal of the transformer and the electrode 21 for preventing the work current from flowing through the transformer. 34 represents an inductor or inductance provided in the work circuit for preventing the ionizing high frequency current from flowing through the work or load circuit 25.

The operation of the apparatus is as follows: The periodically operated valve means permits fluid being periodically conveyed to the flow-restricting means. The latter causes static energy of the fluid being transformed into kinetic energy so that the fluid passes under high velocity through the magnetic field where it is ionized and where an electromagnetic force is induced which in turn is utilized to drive a current through the work resistance 25. The voltage E induced in the individual jets or parts can be expressed according to the law of induction as, $$E = Bv \; 1 \; 10^{-8} \text{ volt},$$

wherein B represents the magnetic induction, $v$ the velocity of the moving fluid, and 1 the length of the fluid, that is, the distance between the electrodes 21 and 22. In analogy with other laws of magnetic induction the induced voltage can be increased by the factor $n$ if the individual fluid parts are passed through $n$ fields or if the apparatus is provided with $n$ nozzles through which different fluid parts are forced.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. The method of generating electric energy from a stream of fluid which includes periodically interrupting the stream of fluid to form individual parts and passing the parts through a magnetic field.

2. The method of generating electric energy from a stream of fluid which includes periodically subdividing the stream of fluid to form individual parts, transforming static energy of the parts into kinetic energy, ionizing the parts and passing them through a magnetic field.

3. Apparatus for generating electric energy from a stream of fluid which includes means periodically interrupting a stream of fluid to form individual parts, means for producing a magnetic field and means for passing the parts successively through the magnetic field.

4. Apparatus for generating electric energy which comprises means including a boiler for generating a stream of fluid, a valve means, motor means operating the valve means to periodically interrupt the stream to form individual parts, a flow nozzle through which the parts are conveyed for changing their static energy into kinetic energy, means producing a magnetic field through which the parts are passed, means for ionizing the parts in the magnetic field and means including a work circuit electrically connected to the edges of the parts.

5. Apparatus for directly transforming the kinetic energy of a stream of fluid into electric energy, comprising a conduit for conducting a stream of fluid, a valve in the conduit, means for opening and closing the valve a predetermined number of times per second to periodically interrupt the stream of fluid to form spaced fluid parts, whereby the internal electric resistance of the fluid is increased and the short-circuiting effect of the fluid on an electromotive force induced in the fluid is accordingly decreased.

6. Apparatus for directly transforming the kinetic energy of a stream of fluid into electric energy comprising a conduit for conducting a stream of fluid, a rotary disk projecting into the conduit and having a plurality of openings uniformly distant from the axis of rotation, a motor for rotating the disk to alternately permit the stream of fluid to flow through one of the openings and to interrupt the stream of fluid by a portion of the disk intermediate two openings whereby spaced fluid parts are formed and the short-circuiting effect of the fluid on an electromotive force induced in the fluid is considerably minimized.

In witness whereof, I have hereunto set my hand.

EMIL RUPP.